Oct. 31, 1967  W. P. WEGLARZ  3,349,470
MOLD FOR CASTING PROCESS

Original Filed June 4, 1962  2 Sheets-Sheet 1

INVENTOR.
Walter P. Weglarz
BY
John B. Sowell
ATTORNEY

Oct. 31, 1967   W. P. WEGLARZ   3,349,470
MOLD FOR CASTING PROCESS
Original Filed June 4, 1962   2 Sheets-Sheet 2
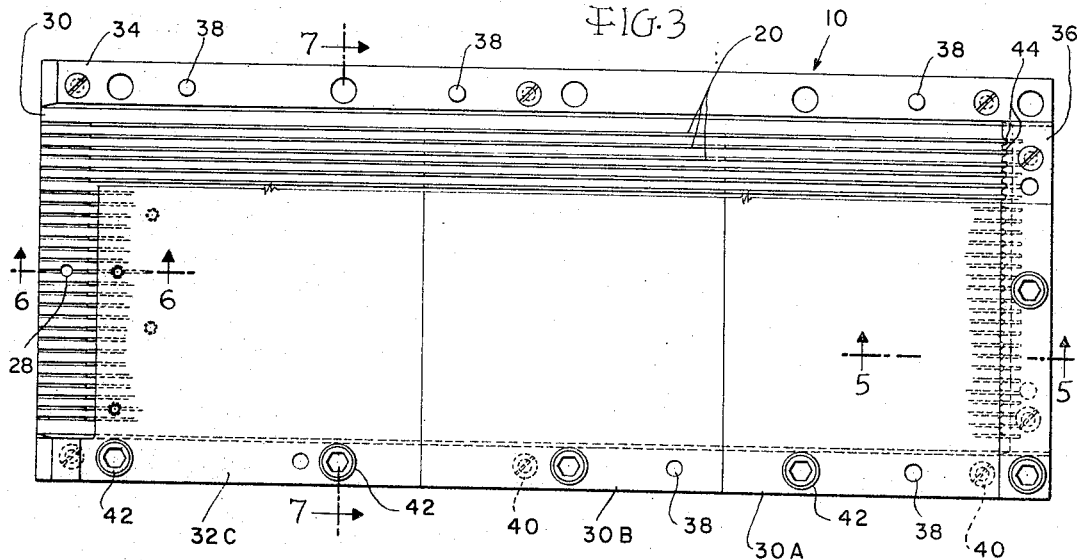
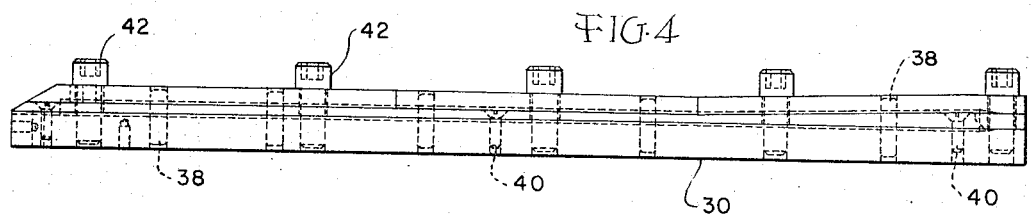
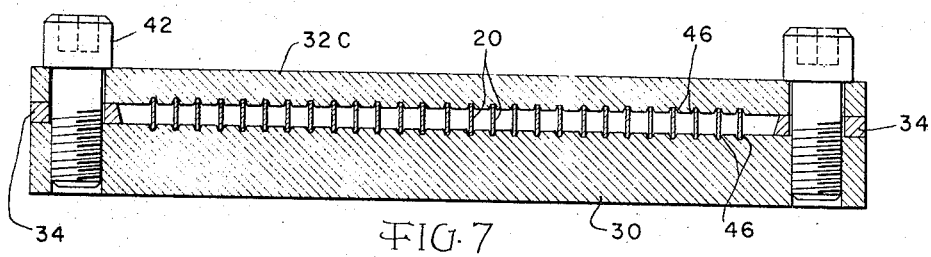
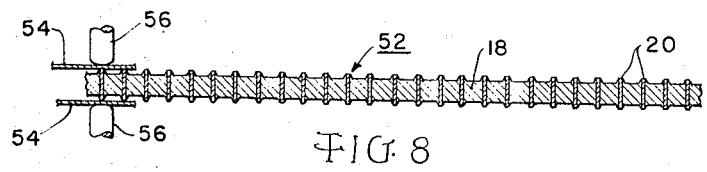
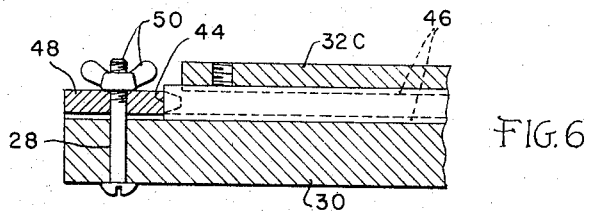
INVENTOR.
Walter P. Weglarz
BY
John B. Sowell
ATTORNEY

United States Patent Office 3,349,470
Patented Oct. 31, 1967

3,349,470
MOLD FOR CASTING PROCESS
Walter P. Weglarz, Lafayette Hill, Pa., assignor to The Budd Company, Philadelphia, Pa., a corporation of Pennsylvania
Original application June 4, 1962, Ser. No. 199,780. Divided and this application Apr. 30, 1965, Ser. No. 509,445
3 Claims. (Cl. 29—527)

This invention is a divisional application of copending application, Mold for Casting Process, Walter P. Weglarz, Ser. No. 199,780, filed June 4, 1962, now abandoned, assigned to the same assignee as the present application, and relates to a fixture for molding the cores of sandwich panels and more particularly to a molding device for casting an electrically conductive matrix metal between vertical sheets of a sandwich panel core.

An optimum configuration for high temperature steel sandwich panel structures employed in rocket engine casings has been found to be vertical section sandwich panel structures having variable cross-sectional areas between adjacent vertical sheets. No practical means are known for making a variable cross-section sandwich panel out of a solid piece of material. Initial attempts to produce variable cross-section vertical section sandwich panel structures from sheet material met with failure because the vertical sheets could only be attached to the horizontal sheets by welding. While brazing is a known means for attachment of the vertical sheets to the horizontal skin sheets it left deposits of highly conductive material which has little or no strength at the temperatures encountered in rocket engines. The only practical means of welding was found to be resistance welding, but it was discovered that the heat generated by resistance welding so weakened the thin vertical sheets that the pressure of the electrodes buckled the vertical sheets before a proper weld bond could be made. It became very desirable to provide a means for supporting the vertical sheets in an aligned position so that they could be welded to the horizontal sheets without overheating and buckling.

Therefore, it is a primary object of the present invention to provide a molding fixture means for aligning the vertical sheets of a sandwich panel core for pouring a cast matrix metal between the aligned sheets;

It is another object of the present invention to provide fixture means for automatically pouring a casting melt;

It is a further object of the present invention to provide a means and method of bonding an electrically conductive matrix material to a portion of vertical sheets of a sandwich panel core;

It is a further object of the present invention to provide a rigid core structure for resistance-welded sandwich panels without machining.

Other features and objects of the invention will be found throughout the more detailed description of the invention which follows. Those novel features believed descriptive of the nature of the invention are described with particularity in the appended claims. To more clearly portray the invention and its manner of operation the description is supplemented with the accompanying drawings:

FIG. 3 is a plan view of the alignment fixture of the casting device of FIG. 1 with the cover partially cut away to show the vertical sheets in place before casting;

FIG. 4 is an elevation of the alignment fixture of FIG. 3;

FIG. 6 is an enlarged section taken at lines 6—6 of FIG. 3 showing the removable guide plate;

FIG. 7 is a section in end elevation of the alignment fixture taken at lines 7—7 of FIG. 3;

FIG. 8 is a section in end elevation of the core structure showing the matrix material attached to the vertical sections of a sandwich panel.

Figure 1:
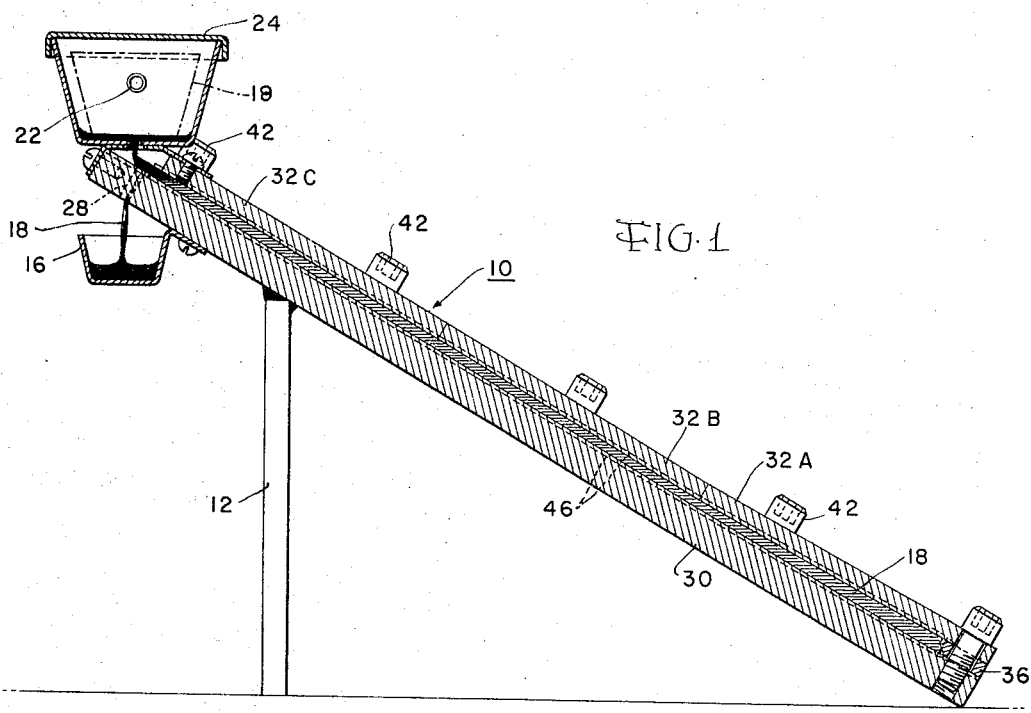
FIG. 1 is a section in elevation of an actual embodiment of the present invention showing the casting device in operative condition.
Figure 2:
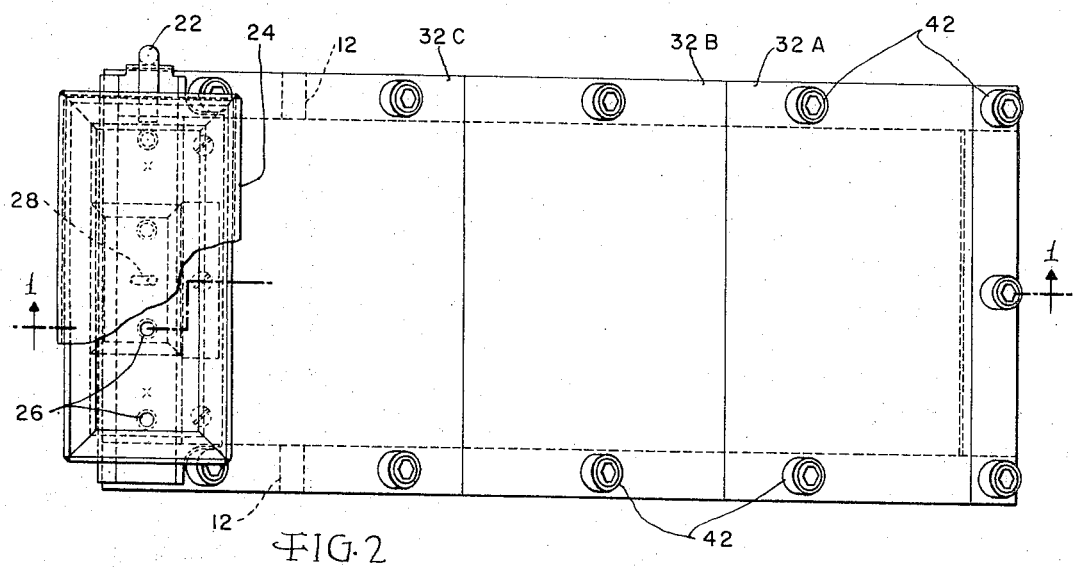
FIG. 2 is a plan view of the casting device of FIG. 1.

Referring now to FIG. 1 where the alignment fixture 10 is supported at an angle by supports 12 and has attached thereto a holding ladle and an overflow ladle 16. Matrix metal 18 when heated to its melting temperature flows from the holding ladle into the cavity of the alignment fixture and when the cavity is completely filled with matrix metal it overflows into overflow ladle 16.

A preferred method of employing the alignment fixture is to insert the complete fixture with holding ladle and overflow ladle into an oven and raise the temperature of the assembled device sufficiently high to melt the matrix metal 18 in the holding ladle 14 thus causing an automatic casting operation to be performed. Vertical sheets 20 employed in sandwich panels for rocket engines are made of high temperature metals and/or stainless steel. In the present invention these vertical sheets may be blanked out of flat sheet or cut by other precision means. In order to obtain an electrical bond between the vertical sheets and the matrix metal 18 it is necessary that the vertical sheets be chemically clean when the matrix metal is cast. It was discovered that a preferable method of obtaining an electrical bond between the vertical sheets and the matrix metal is to coat the vertical sheets before inserting them into the alignment device to insure that an electrical bond is already obtained between the vertical sheets and the matrix metal adjacent thereto. To provide an electrical bond between the vertical sheets and the matrix metal the vertical sheets were coated by dipping chemically cleaned and fluxed vertical sheets in a molten solution of the matrix metal. While many methods are probably applicable to obtaining this initial bond between the matrix metal and the vertical sheets it was found that the vertical sheets could be prepared as follows: (1) mechanically rough clean the vertical strips; (2) chemically degrease the vertical strips; (3) chemically clean the vertical strips (preferably in a hot alkali solution); (4) chemically pickle the vertical strips in an acid solution; (5) chemically treat the vertical strips with a flux solution; (6) dip the vertical sheets in molten matrix metal; (7) wash the vertical strips in hot water to remove any residual contamination. Once the vertical strips have been coated with an electrical bond of matrix metal as explained above they may be stored for future insertion into the alignment fixture 10 which holds them in a vertical array so that they may be cast into an integral core structure surrounded and supported by an electrically conductive matrix metal such as tin, aluminum, copper, etc. The coated strips remain free of oxidation and form a wetting layer for matrix metal cast in the fixture.

A further precaution which may be taken while casting the sandwich panel core includes the expedient of introducing an inert gas at the fitting 22 into the holding ladle 14 which is provided with a cover 24. The inert gas is preferably supplied at the time the casting device is inserted into the furnace and prior to heating of the casting device. As the temperature is increased the inert gas circulates through the outlet ports 26 in the holding ladle into the cavity of the alignment fixture and escapes through the overflow port 28 leading to the overflow ladle, thus protecting the coated vertical strips from oxidation and insuring that the electrical bond between the matrix metal and vertical strips is entirely free of impurities due to oxidation.

Referring now to FIGS. 3 and 4 which show the assembly fixture 10 disassociated from the ladles. The fixture illustrated is made from plate material held together with screw fittings. A bottom plate 30 is separated from the top plate 32, which is divided into three sections 32A, 32B and 32C, by spacer plates 34 and an end guide plate 36. Spacer plates 34 and end guide plate 36 are machined to the contour of the vertical sheets 20 and may be removed and replaced with different shapes or shapes of different thickness. The plates are aligned accurately by guide pins 38. Spacer plates 34 and end guide plate 36 are secured to the bottom plate by recess screws 40.

Figure 5:
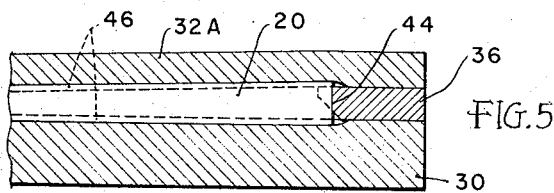
FIG. 5 is an enlarged section taken at lines 5—5 of FIG. 3.

In order to prepare the casting device for insertion into the furnace the top plate held by studs 42 is removed. End guide plate 36 is provided with a series of V-notches 44 aligned over a like plurality of V-grooves 46 in the bottom plate. The grooves 46 in the top and bottom plate are wide enough at the top of the groove to easily receive the vertical sheets 20, but are only wide enough at the bottom of the groove to receive the basic vertical sheets, thus the vertical sheets seal the edges from receiving any cast metal. The end guide plate 36 is shown in an enlarged section in FIG. 5 with the bottom plate 30 and top plate 32A secured thereto holding the vertical sheets 20 in its aligned position ready for casting. In order to permit ease of assembly of the vertical sheets 20 into the alignment fixture an end comb plate 48 is temporarily attached to the bottom plate 30 by means of a wing nut and bolt 50 inserted through the overflow port 28 as shown in FIG. 6. With the top cover removed the vertical sheets having a variable height cross-section are inserted into the V-notches 44 provided in the end guide plate and the end comb plate. This assures that the vertical sheets are positioned into the V-grooves 46 of the bottom plate 30. After all of the vertical sheets are properly aligned into the grooves and notches the top plate 32B may be fitted to the bottom plate by studs 42. Once the center section of the top plate 32B has been properly fitted the end comb plate 48 may be removed without altering the correct alignment of the vertical sheets fitted in the top plate, bottom plate and end guide plate. With the end comb plate removed the vertical sections may be physically inspected and cleaned by air blast if desired before attaching the end sections of the top plate 32A and 32C.

FIG. 7 shows the vertical sheets 20 in aligned position prior to the casting operation.

FIG. 8 shows the vertical sheets 20 after the matrix metal has been deposited therebetween. The core structure 52 shown in FIG. 8 is sufficiently accurate, rigid and stable to permit horizontal skin sheets 54 to be resistance-welded above and below the core without further machining. When welding electrodes 56 are clamped to the skin sheets 54 and current and pressure applied therethrough, electrical current is concentrated at the high points of the vertical sheets causing them to melt at the tops and be forged by welding electrode pressure into the skin sheets. When the skin sheets are forced flush against the matrix metal an electrical shunt or bypass path is formed around the tip of the vertical sheet thus preventing the vertical sheets from overheating and insuring that a proper weld is made between the horizontal skin sheets and the vertical sheets. It has been observed that electrical current passing between the electrodes concentrates at the junction between the vertical sheets and the horizontal sheets, and is diffused and/or dispersed around the portion of the vertical sheet abutting the matrix metal, thus, preventing the vertical section from overheating while being supported by the matrix metal bonded thereto. When the matrix metal is not bonded to a chemically clean surface there is a layer of high resistance metal adjacent the vertical sheet which heats excessively during resistance welding to cause the vertical sheet to buckle as the matrix metal melts.

The grooves 46 in the top and bottom plates need not be parallel for it can be seen that the split top 32 and end comb plate 48 permit perfect alignment of vertical sheets in any desirable pattern such as a fan. Fan patterns have been employed in flat sandwich panels which were subsequently formed into conical shapes for rocket nozzles prior to removal of the matrix metal.

If the vertical sheets are coated along the edges as well as the sides, the grooves 46 are shaped wide enough to receive them even though the top plate is fastened down tight. If the preferred practice is followed the fixture is inserted into a furnace with inert gas introduced into the closed holding ladle. Heating of the fixture sufficiently to melt the matrix metal in the ladle requires about thirty minutes, and by this time, the fixture and ladle are completely purged. As the fixture heats up any metal coated on the edges of the vertical strips is squeezed out by the top and bottom plates. While the edges of the strip could be cleaned and the matrix metal cast in the fixture without heating it, the present apparatus and method insures consistent results without the necessity of any expensive preparation or equipment.

The novel alignment jig permits casting accuracies equal to high pressure die casting and eliminates any machining operation or preparation prior to welding the vertical sheets to the horizontal skin sheets.

Not only do the grooves 46 in the top and bottom plates provide critical alignment of the vertical sheets in the jig but they may be varied in depth so that the height of the vertical sheet above the body of the matrix metal is critically controlled at a desired height. This protruding height of vertical strip is forged into the weld by resistance welding. When the height and thickness of the vertical sheets are varied it is necessary to vary or control the height of vertical strip protruding above the matrix metal; the novel alignment fixture permits control of this critical dimension as well as aligning and spacing of the vertical strips prior to casting.

While a single preferred embodiment of the present invention is offered by way of illustration it is apparent that different shapes of cores having vertical strips may be made by the persent invention. It is seen that the invention provides an improved precision casting device which eliminates machining of cores employed in resistance welded sandwich panels.

It is to be understood that other means may be associated with the casting device and employed within the general scope of the present invention which is only limited by the appended claims.

What is claimed is:

1. A method of making a core structure for vertical sheet sandwich panels comprising, machining a plurality of vertical sheets to a predetermined contour, cleaning said vertical strips, pickling said vertical strips, dipping said vertical strips in a molten solution of matrix metal, cooling and cleaning said vertical strips, placing said vertical strips in a mold having alignment grooves therein, attaching a holding ladle having an outlet port therein at the inlet of said mold, attaching an overflow ladle to an outlet in said mold, placing an amount of matrix metal in said holding ladle in excess of the amount required to fill said mold, placing said molds and said ladles in a furnace, raising the temperature of said mold and said ladles to a temperature above the melting temperature of said matrix metal to cause said matrix metal to flow out of said outlet port of said holding ladle into said mold and spilling the excess into said overflow ladle, cooling said mold and said ladles and removing said vertical strips from said mold with said matrix metal integrally cast between said vertical strips to provide a core structure.

2. A method according to claim 1 wherein said matrix metal is pure tin.

3. A method according to claim 1 wherein said vertical strips are stainless steel.

References Cited

UNITED STATES PATENTS

| | | | |
|---|---|---|---|
| 415,174 | 11/1889 | McCarty | 164—111 X |
| 633,872 | 9/1899 | Mackin | 164—323 |
| 756,325 | 4/1904 | Brooker | 164—342 X |
| 2,316,180 | 4/1943 | Mueller | 164—348 X |
| 2,521,362 | 9/1950 | Grausam | 164—322 X |
| 2,995,816 | 8/1961 | Ma | 164—108 X |
| 3,089,209 | 5/1963 | Phillips et al. | 164—89 X |
| 3,098,921 | 7/1963 | Jepson | 164—108 X |
| 3,221,836 | 12/1965 | Kleinig | 164—108 X |
| 3,264,697 | 8/1966 | Price et al. | 164—108 X |

CHARLIE T. MOON, *Primary Examiner.*

P. M. COHEN, *Assistant Examiner.*